United States Patent [19]

Lamberg

[11] Patent Number: 5,502,818

[45] Date of Patent: Mar. 26, 1996

[54] PROCEDURE FOR THE DETERMINATION OF MESSAGE IDENTIFICATION IN THE DATA TRANSMISSION NETWORK OF AN ELEVATOR SYSTEM

[75] Inventor: Lauri Lamberg, Hyvinkaa, Finland

[73] Assignee: Kone Elevator GmbH, Baar, Switzerland

[21] Appl. No.: 261,209

[22] Filed: Jun. 15, 1994

Related U.S. Application Data

[63] Continuation of Ser. No. 822,204, Jan. 17, 1992, abandoned.

[30] Foreign Application Priority Data

Jan. 17, 1991 [FI] Finland ..................... 910260

[51] Int. Cl.$^6$ .............................. G06F 13/00; H04Q 5/02
[52] U.S. Cl. .................. 395/200.16; 340/825.52; 340/825.53; 395/829
[58] Field of Search ............ 340/825.06, 825.07, 340/825.08, 825.52, 825.53, 825.5; 370/85.1, 85.2; 395/200.16, 829

[56] References Cited

U.S. PATENT DOCUMENTS

| | | | |
|---|---|---|---|
| 4,410,889 | 10/1983 | Bryant et al. | 340/825.2 |
| 4,587,511 | 5/1986 | Dirnberger et al. | |
| 4,680,583 | 7/1987 | Grover | 340/825.52 |
| 4,683,989 | 8/1987 | Pillage et al. | |
| 4,689,786 | 8/1987 | Sidho et al. | 370/85.1 |
| 4,762,204 | 8/1988 | Blain et al. | 187/101 |
| 4,847,834 | 7/1989 | Bryant | 370/85 |
| 4,912,627 | 3/1990 | Ashkin et al. | 395/829 |
| 5,301,273 | 4/1994 | Konishi | 395/200.16 |
| 5,414,813 | 5/1995 | Shiobara | 395/200.16 |

FOREIGN PATENT DOCUMENTS

| | | | |
|---|---|---|---|
| 0182417 | 11/1985 | European Pat. Off. | H04L 11/16 |
| 0381386 | 8/1990 | European Pat. Off. | |
| 892940 | 12/1989 | Finland . | |
| 60-229546 | 4/1986 | Japan | 340/825.52 |
| 1125141 | 8/1989 | Japan | 340/825.52 |
| 2172779A | 9/1986 | United Kingdom | H04L 11/16 |

OTHER PUBLICATIONS

Philips Components "PCA82C200 Stand-alone CAN-controller", Jul. 1990, pp. 1–42.

*Primary Examiner*—Allyssa H. Bowler
*Assistant Examiner*—Mark H. Rinehart
*Attorney, Agent, or Firm*—Jacobson, Price, Holman & Stern

[57] ABSTRACT

A procedure is disclosed for determining the message identifiers in a control area network CAN data transmission network of an elevator system where message identifiers are used in the transmission of messages. Each node in the network monitors the data transmissions in the network and stores the other message identifiers in use by the other nodes. When selecting a message identifier, the node makes use of a random number to select an unused identifier from an identifier table.

5 Claims, 7 Drawing Sheets

PROCEDURE FOR THE DETERMINATION OF MESSAGE IDENTIFICATION IN THE DATA TRANSMISSION NETWORK OF AN ELEVATOR SYSTEM

This is a continuation of application Ser. No. 07/822,204, filed Jan. 17, 1992 which was abandoned upon the filing hereof.

FIELD OF THE INVENTION

The present invention relates to a procedure for determining the message identifiers in the data transmission network of an elevator system.

BACKGROUND TO THE INVENTION

The data transmission network of an elevator system typically consists of a bus, a controlling computer and actuators connected to it, such as the call buttons at the landings and the floor call buttons in the elevator cars, the door motor control etc., which constitute the nodes of the network. In CAN (Controller Area Network) networks, whose speed characteristics make them well suited for use in elevator systems, a message identifier is used by a transmitting node when transmitting a message, whereas in ordinary local networks a node identifier (referred to in CAN networks a message identifier) is used for the selection of the messages to be received.

In current practice, the message identifiers used in each node are set by means of setting switches provided in each of the nodes. A fixed message identifier is programmed for each node separately, or the identifiers are set for each node by using a special tool. The use of setting switches makes the node more expensive and more difficult to install. When fixedly programmed identifiers are used, each node has individual characteristics. This makes them difficult to produce, and in some cases it may be difficult to obtain spare parts for the nodes. The use of a separate tool requires additional installation time, and the special tool, but it does not remove the risk of incorrect settings.

SUMMARY OF THE INVENTION

An object of the present invention is to overcome the above-mentioned drawbacks of the prior-art.

According to the invention, there is provided a procedure for determining the message identifiers in a CAN data transmission network of an elevator system where a predetermined number of message identifiers are used in the transmission of messages, said procedure comprising the steps of data transmissions taking place in the network are monitored by a node in the network, and the other message identifiers in use in the network are stored by said node; and said node selects a message identifier that is free.

The procedure of the invention makes it possible to avoid setting errors made during installation. Moreover, it provides a simpler method of installing the nodes. Also, the nodes themselves are cheaper because, for example, separate switches for the setting of message identifiers are not needed.

Furthermore, producing nodes designed for the same function is easier because they are fully identical, including their software. In particular, the procedure allows the installation of fully identical nodes (e.g. landing call buttons) in the same network. The procedure also allows the detection of wrong or identical floor number settings.

BRIEF DESCRIPTION OF THE DRAWINGS

Embodiments of the invention will now be described, by way of example, with reference to the accompanying drawings, in which.

DETAILED DESCRIPTION OF A PREFERRED EMBODIMENT

Figure 1:
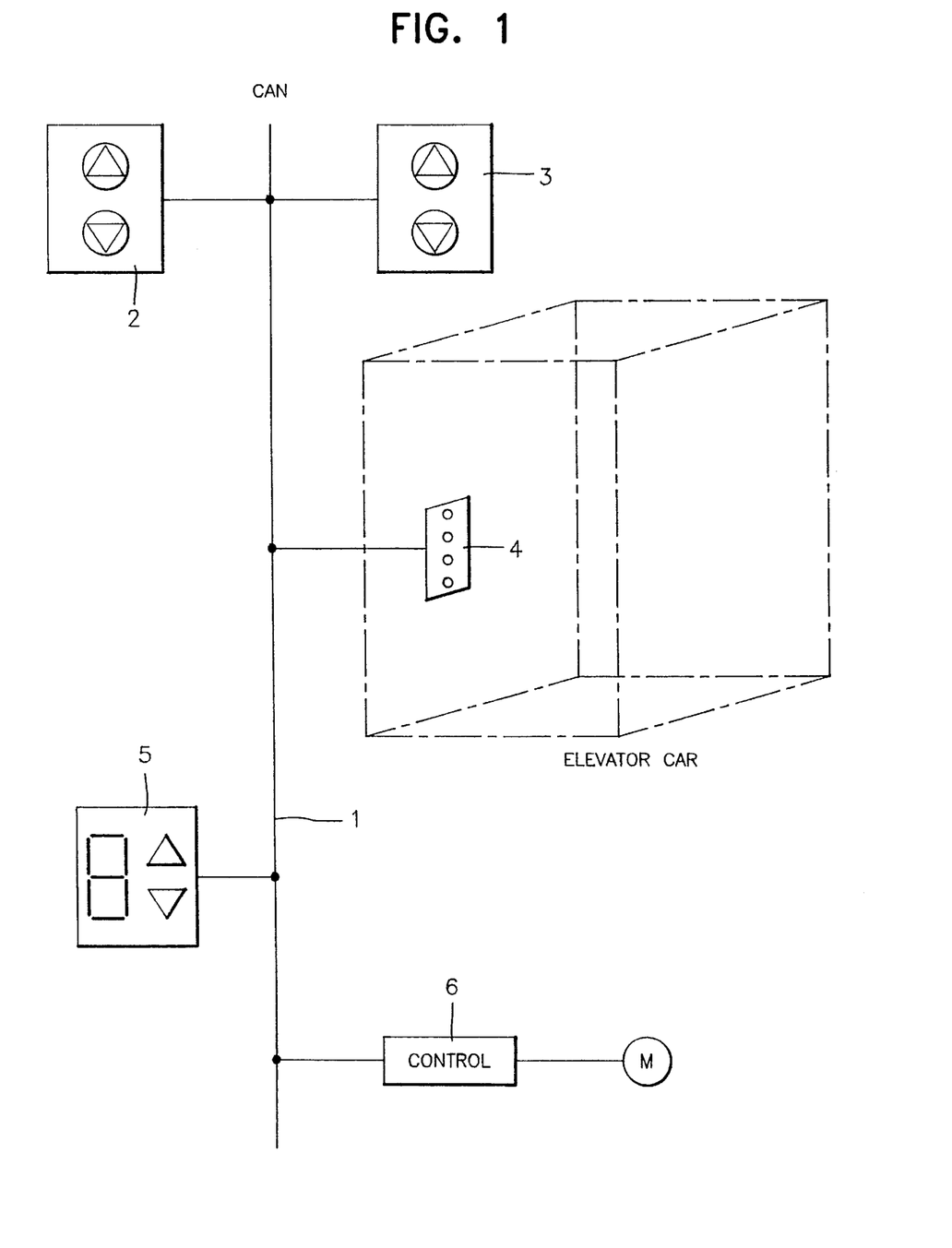
FIG. 1 schematically illustrates the data transmission network of an elevator system.

FIG. 1 shows a simplified representation of a CAN data transmission network in an elevator system. In addition to a bus 1 and a controlling computer (not shown), the nodes of the network consist of call buttons 2, 3 placed at the same level, the floor call buttons 4 in the elevator car, a floor and direction indicator 5, and a door motor (M) control unit 6. Naturally, landing call buttons, for example, are needed for each floor, so their number is considerably larger than that shown in FIG. 1.

In the procedure of the invention, each node 2–6 connected to the network, monitors all the transmissions in the network and records all the message identifiers it detects. A node selects for itself a message identifier among those it does not see in the network, making use of a random number obtained as explained later e.g. from a free-running counter. Having selected a message identifier, the node sends a proposal into the network, adding the random number to the message. The random number is added to the message in order to make sure that, if another node happens to select the same message identifier and send its proposal simultaneously into the network, the messages will collide in a detectable manner. It will be appreciated that, in a CAN network, a collision of two identical messages transmitted simultaneously can not be detected.

It the message is transmitted without a collision, the transmitting node waits for a predetermined minimum time plus a random delay, during which time all the other nodes can reply if they have previously selected the same identifier. If the node receives, from any other node in the network, a reply to the effect that the identifier cannot be accepted, or if a collision occurred during the transmission, then the selection process is started again and the identifier used in the previous attempt is recorded as being used or proposed by another node, depending on state of the reply. In the case of a collision the state is "in use", while in other cases the state is as indicated by the reply message.

There are three levels of proposal messages which can be transmitted by a node; "I propose", "in use", and "I am using". Additionally, each node sends an "I don't accept" message if a message received from the network is of a lower level or the same level as the node's own message. "In use" means that the node intends to use the identifier in question.

Normal operation of a node is started once the node succeeds in sending a message of the "I am using" level into the network, and the message has been accepted by the other nodes. During normal operation, the node monitors the transmissions in the network as far its own message identifier is concerned, and, if it finds that another node is proposing to use the same identifier, then the node sends an "I don't accept" message containing the state of its own identifier.

In start-up situations some message identifiers may remain in the "I propose" or "in use" state of another node. For this reason there must be an arrangement for returning such message identifiers to the free state to ensure that, even when nearly all the identifers are already in use, a free identifier might still be found somewhere. This can be achieved, for example, by an arrangement whereby, if the identifier has one of the states referred to, the counter associated with that state is decreased until it returns to the free state.

Figure 2:
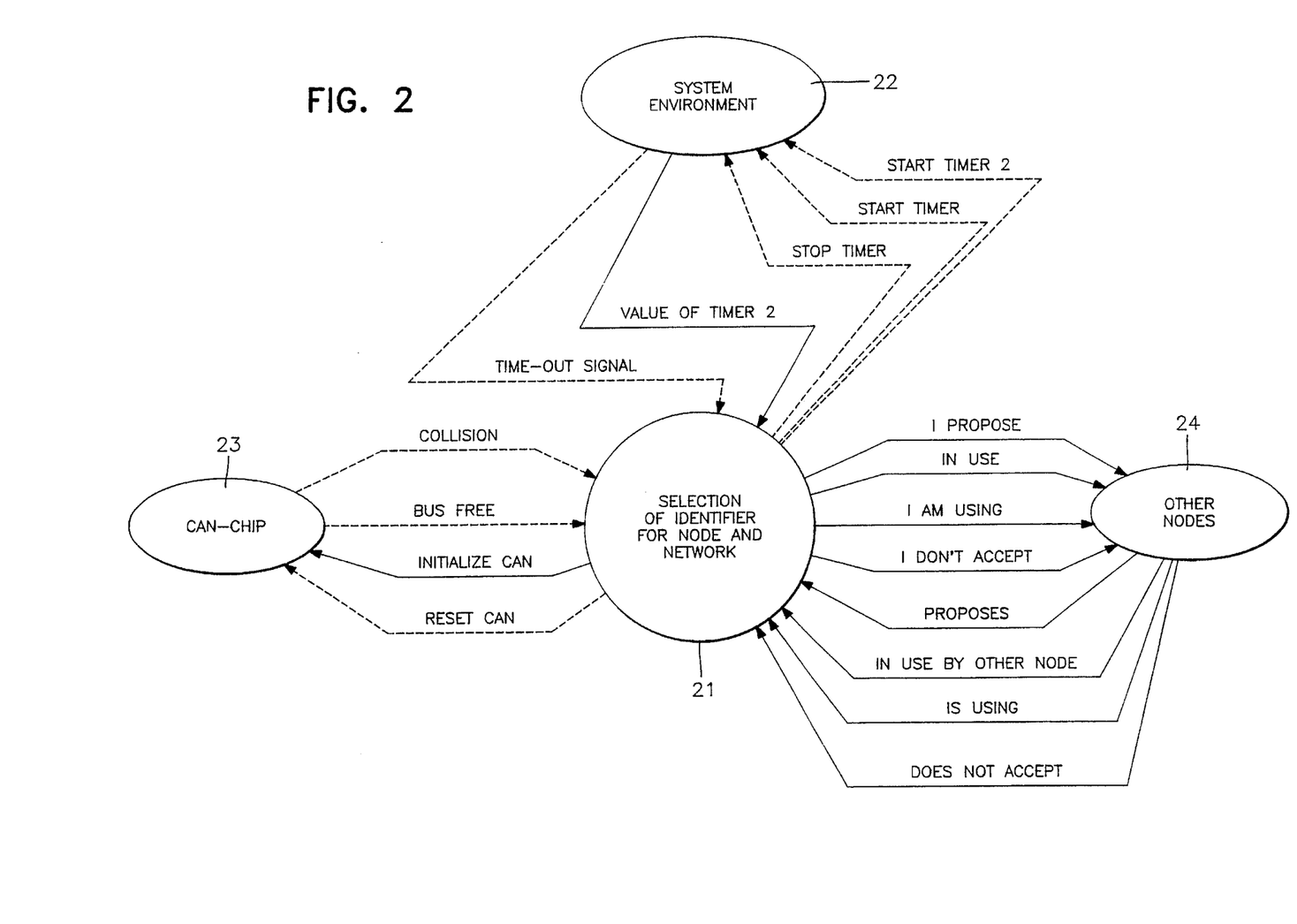
FIG. 2 schematically illustrates the connections of a node with the network.

FIG. 2 schematically presents the node software of the invention in the form of a SA-diagram, the operation of which is described below. Between the block 21 representing the selection of a node and network identifier, and the system environment block 22, FIG. 2 shows the value of timer2 as an arrow pointing from the system environment 22 towards the selection 21, and the time-out signal as a broken-line arrow. In addition, FIG. 2 shows broken-line arrows "stop timer", "start timer" and start "timer2" pointing from the selection block 21 towards the system environment block 22. Pointing from the CAN chip 23 towards the selection block 21 are broken-line arrows "collision" and "bus free", and in the opposite direction, the arrow "initialize CAN" and the broken-line arrow "reset CAN". Pointing from the section block 21 to the other nodes 24 are arrows representing the three proposal message levels referred to above and the "I don't accept" message, and the corresponding messages as transmitted in the opposite direction from the other nodes.

Figure 3:
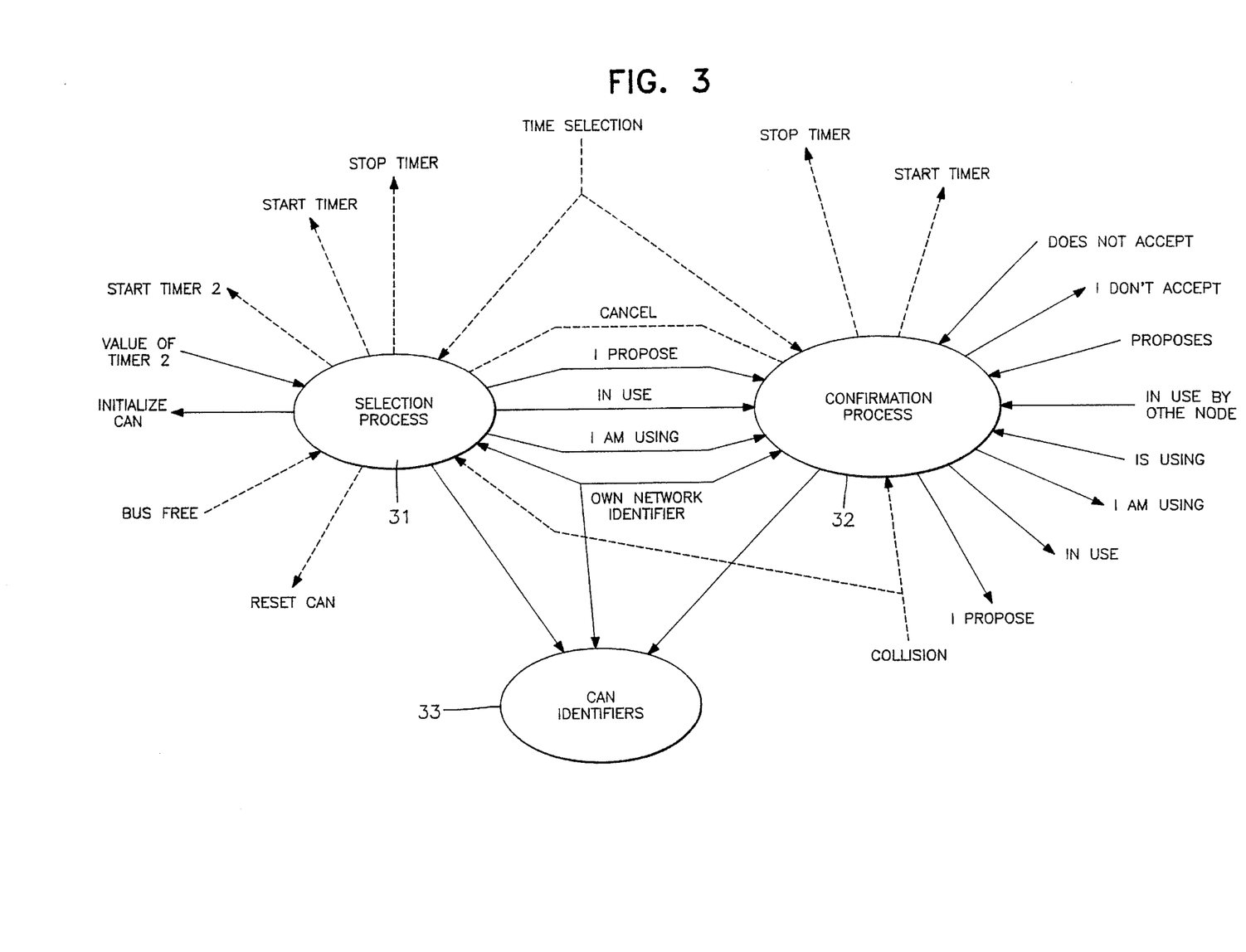
FIG. 3 schematically illustrates the selection of an identifier.

FIG. 3 schematically presents a more detailed illustration of the process of identifier selection in the network and a node. The process consists of an identifier selection process 31 and a confirmation process 32. In addition, FIG. 3 illustrates a table 33 of the identifiers used in the network, containing the free identifiers as well as those already in use. The messages presented above are linked with these in the manner shown in FIG. 3, as follows: The identifier selection process 31 outputs timer stop and start, start of timer2, network initialization and reset signals. In addition, the identifier selection process 31 outputs the above-mentioned message levels (i.e. "I propose", "in use" and "I am using") and its own message identifier to the confirmation process 32. Inputs to the identifier selection process 31 are time-out, value of timer2 and bus free signals, as well as a cancel signal from the confirmation process 32 and a collision signal. Both the selection and confirmation processes 31 and 32 are linked with the identifier table 33 so that information flows from the confirmation process 32 to the table 33 and similarly from the selection process 31 to the table 33 and vice versa.

The selection process 31 selects a message identifier using the table and a random number. The random number is also used as a basis for the transfer delay to help avoid collisions. In addition, the random number sent is into the network to ensure a detectable collision in the event of simultaneous transmission by two or more nodes with the same identifier.

The confirmation process 32 receives all messages and updates the table 33 with the identifiers proposed and used. It also sends cancellation messages to the selection process 31 if the same identifier is detected in the network. Additionally, the confirmation process 32 makes sure that identifiers proposed but not in use are set free.

Figure 4:
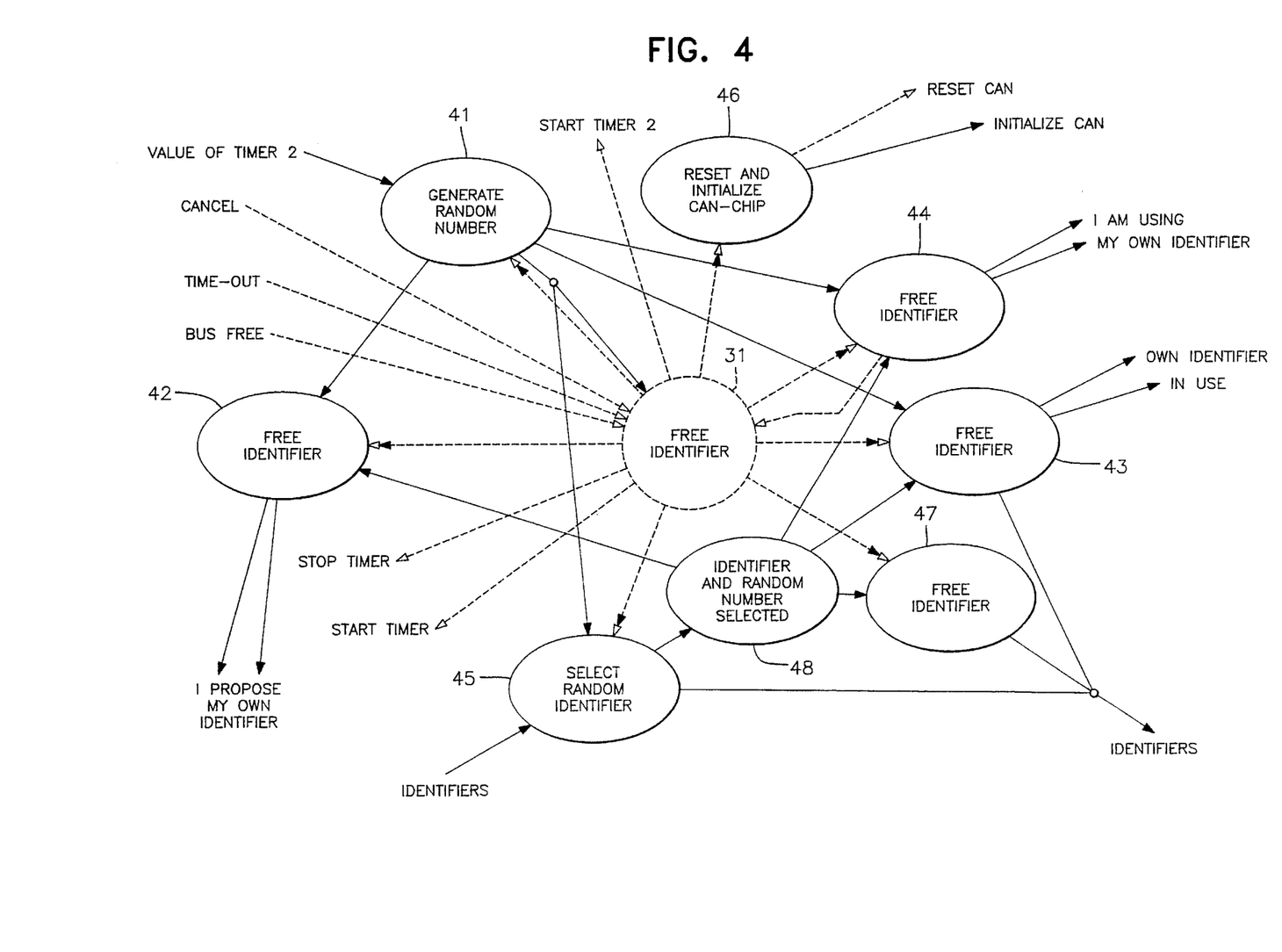
FIG. 4 schematically illustrates the linkages in the selection process.

As shown in FIG. 4, the selection process 31 receives the cancel, time-out and bus free messages, and transmits timer start and stop messages. The value of timer2 is passed to the random number generation 41, which is linked with the selection process 31, transmission of proposal, 42–44, and selection of a new identifier 45. The identifiers are also input to the selection 31, which is linked with a storage 48 containing the selected identifier and random number. From this storage 48, the proposal transmission 42–44 and free identifier 47 functions are controlled. In addition, the selection process 31 controls all the sub-processes 41–47 mentioned, including the reset and initialize CAN chip function 46. Finally, the selection process 31 receives a control signal from the "I am using" sub-process.

Figure 5:
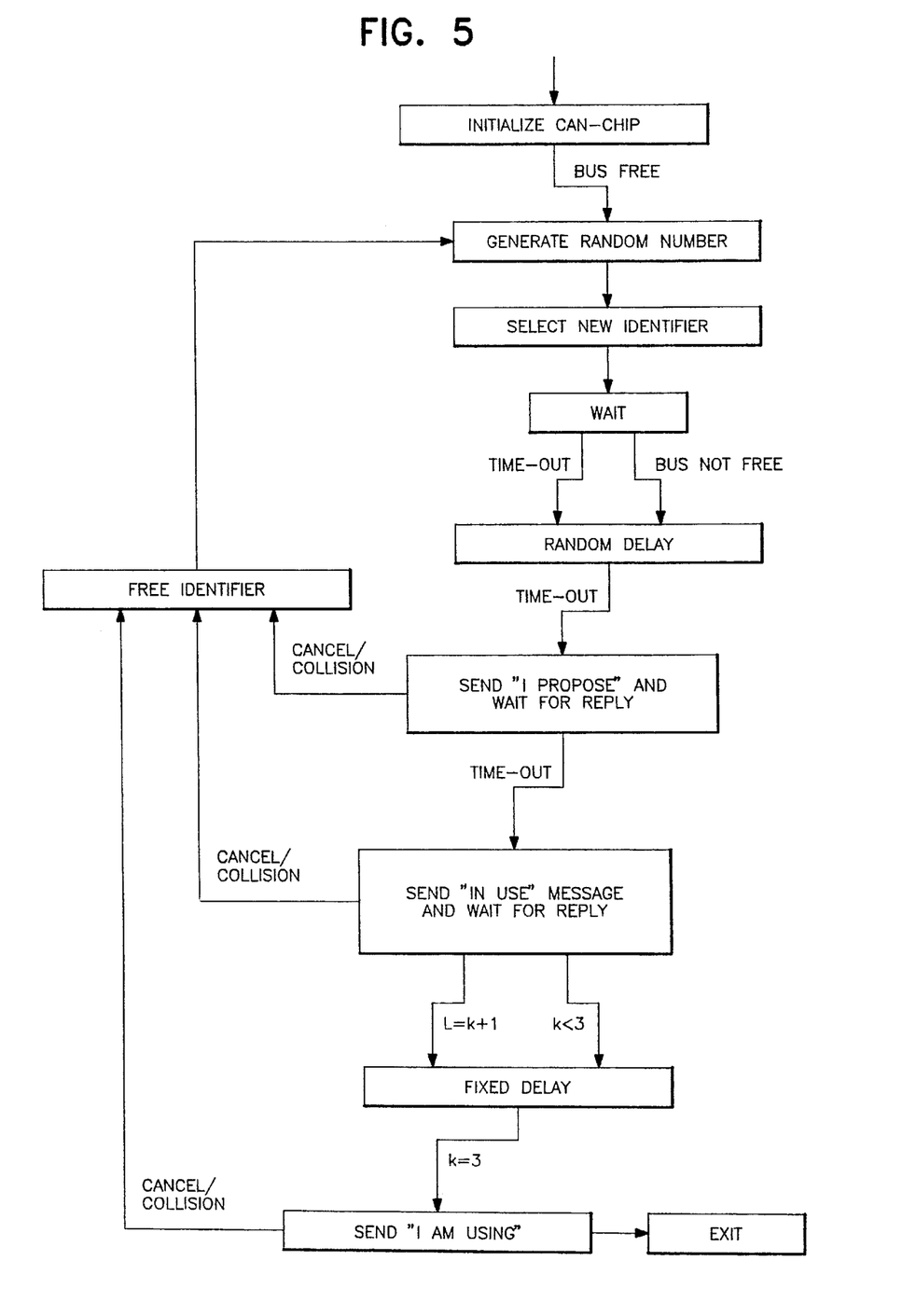
FIG. 5 shows a flow chart illustrating the selection process.

As shown by the flow-chart in FIG. 5, the identifier selection process starts by activating the function "initialize CAN chip" of a node connected to the network, and starting the first timer (timer2). Timer2 may be a free-running counter, for example. When the bus is free (i.e. none of the nodes is transmitting anything), a random number is generated by reading the value of timer2.

Next, the process for selecting a new identifier is activated and a new identifier is selected by choosing the identifier stored at an address in the identifier storage determined by the random number. If the identifier is free, the node selects it. After this, a second timer is started and the process waits for a message appearing in the network or the start of a "watchdog" function activated by the second timer. When a message transmitted in the network or the start of time monitoring is detected, a random delay is selected on the basis of the random signal from timer2.

After the delay, the first message ("I propose") is sent into the network. The message contains the identifier, the random number and the "I propose" state. The random number is used to ensure a detectable collision in the event of simultaneous transmission of two messages, because, as stated above, when the identifiers are identical they will not collide in a detectable manner, whereas the random numbers will. After this, the process again waits for a time equal to the delay to see if the identifier is already in use. At this stage, the control quantity k representing the number of "in use"-level messages transmitted is zero.

Upon the lapse of the delay (time-out), none of the nodes has replied that the identifier is already in use in some other node, and the second message ("in use") is sent into the network. At the same time, the second timer is started, which after 250 ms (for example), can send a timeout signal. The second message is transmitted, for example, three times (k<3) if none of the other nodes has replied that the identifier in question is reserved. Between the transmissions there is a waiting time of, for example, 250 ms.

Finally, after another fixed delay, the third message ("I am using") is transmitted and, after an additional time-out signal, the program exits the selection process.

If another node has reserved the identifier in question for itself at some stage of message transmission (its proposal is at a higher level) or a collision of messages occurs, then the process returns to the generation of a new random number.

Figure 6:
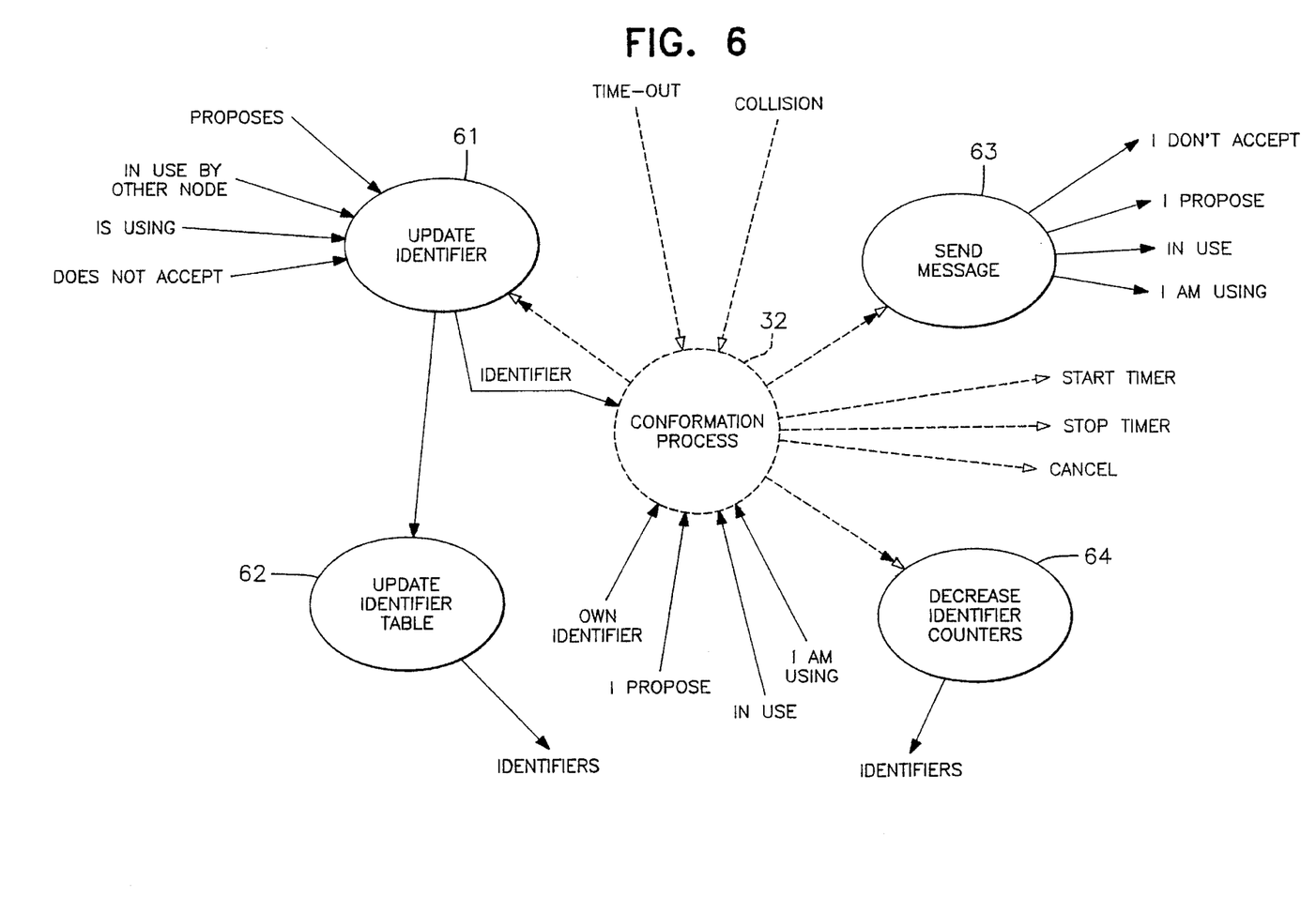
FIG. 6 schematically illustrates the linkages in the confirmation process.

As illustrated in FIG. 6, the confirmation process 32 controls message reception 61, identifier table updates 62, message transmission 63 and decreasing of identifier counters 64. The confirmation process 32 received the time-out and collision signals, as well as the identifier from the message reception 61. Moreover, the reception process is linked with the transmission and updating processes.

In addition, the confirmation process 32 receives the node's own identifier and own proposals, and it outputs the start timer, stop timer and cancel signals.

Figure 7:
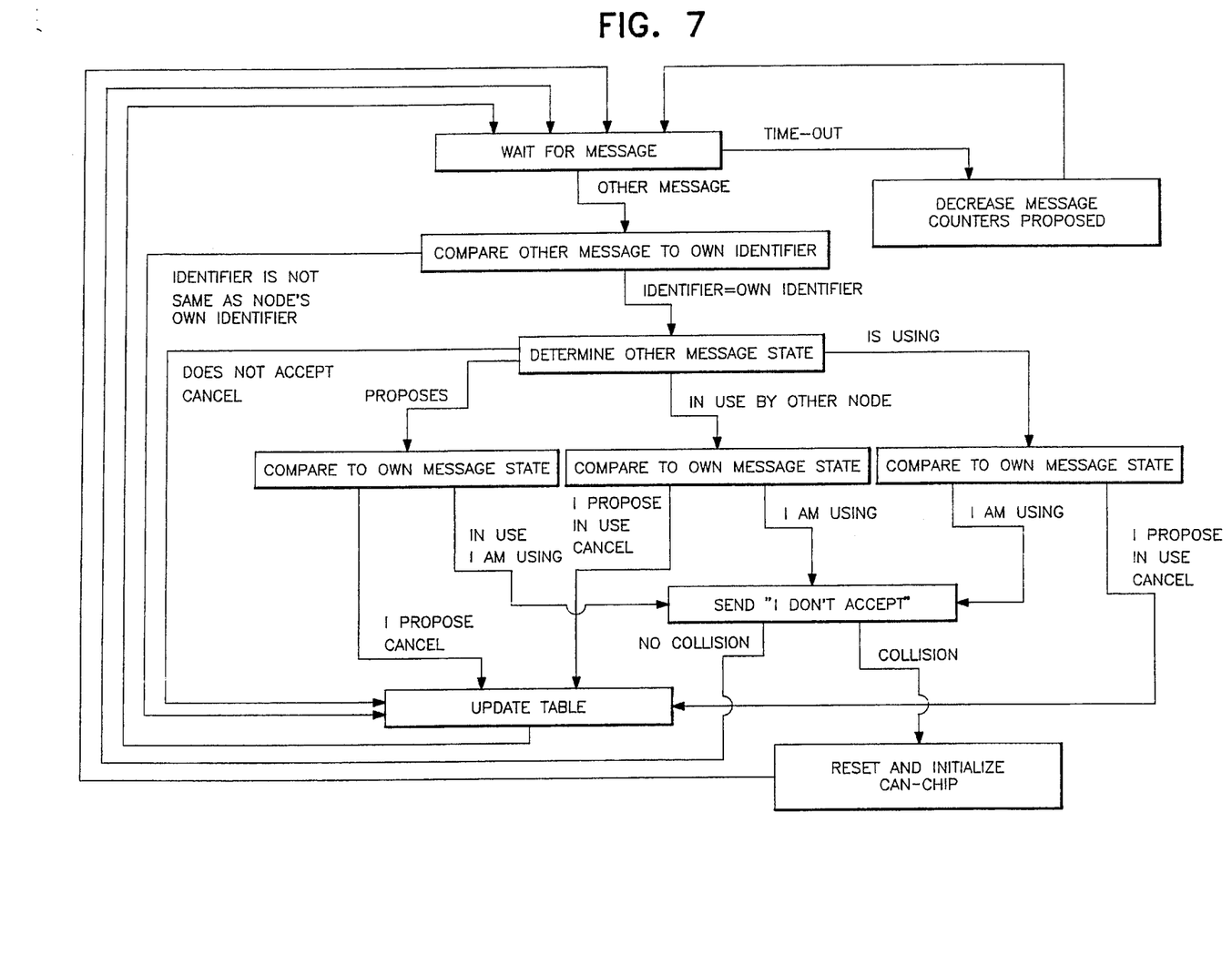
FIG. 7 shows a flow chart illustrating the confirmation process.

As shown in FIG. 7, the identifier confirmation process first waits for messages arriving from the other nodes. When a message arrives, it is compared to the node's own message identifier. If it differs from the node's own message identifier, the state of the message is stored in memory. If the identifier is identical with that in the node's own message, the states of the messages are compared to each other If the arriving message is "does not accept", its state is written into the table and a "cancel" signal is sent to the selection process.

If the arriving message is in the "proposes" state and the node's own message is in the same state, then the node's own message will be cancelled, and the table updated. On the other hand, if the node's own message is at higher level of proposal (i.e. "in use" or "I am using"), it sends an "I don't accept" message into the network and remains waiting. A corresponding procedure is followed at the other levels: if the messages are of the same level, the node cancels its own message identifier, and if its own message is of a higher level, it continues transmitting. Each time the node cancels its own message identifier, it updates the table with the identifier of the other node.

If no collision occurs after the transmission of an "I don't accept" message, the node starts waiting for a new message. If a collision occurs, the CAN chip is reset and initialized before starting to wait for a new message. This is a continuous process. If a time-out occurs while the node is waiting for a message, the identifier counters in the "I propose" and "in use" states are decreased and the node returns again to the waiting state. It should be noted that in FIG. 5 and 7 a line is shown under the condition for exiting a state in the process and the actions to be taken after that are shown beneath the line.

It will be obvious to a person skilled in the art that different embodiments of the invention are not restricted to the examples described above, but that they may instead be varied within the scope of the following claims. For example, if the range of message identifiers in the whole CAN network is to be utilized, a node may select several message identifiers for itself by the same procedure.

We claim:

1. A method for determining message identifiers in a controller area network (CAN) of an elevator system having a plurality of nodes, wherein a predetermined number of predetermined message identifiers are used in the transmission of messages between nodes of said network, said method being implemented simultaneously by each node in the network and comprising the steps of:

monitoring data transmissions taking place in the network, and storing those message identifiers being used by other nodes of the network, and storing a respective message state of each message identifier being used by other nodes of the network;

selecting a message identifier, from among said predetermined message identifiers, that is not among those message identifiers being used by other nodes of the network, and waiting for a first delay period, the duration of said first delay period being equal to a predetermined delay period plus a random delay period;

following expiry of the first delay period, performing an availability test by sending an "I propose" message containing the selected message identifier and a random number into the network, the random delay period preventing simultaneous transmission of "I propose" messages from each node in the network, and the random number ensuring that a detectable collision occurs even if "I propose" messages are transmitted simultaneously and waiting for a second period of time;

if no cancellation reply is received from another node and a message collision is not detected before expiry of the second delay period, sending an "In use" message containing the selected message identifier into the network, and waiting for a third delay period;

if no cancellation reply is received from another node and a message collision is not detected before expiry of the third delay period, sending an "I am using" message containing the selected message identifier into the network;

wherein said "I propose", "In use" and "I am using" messages constitute messages having progressively higher message states and wherein, following the transmission of each said "I propose", "In use", and "I am using" messages, a node sends a cancellation message to another node if it receives, from the other node, a message having the same message identifier and any one of an equal or a lower message state; and if, before the expiry of each of the first and second delay periods, no message is received from another node of the network whose respective message state is either "I propose" or "In use", reducing said stored message state of the message identifier associated with said other nodes.

2. A method according to claim 1, wherein in addition to the selected message identifier, each message sent by a node contains a random number.

3. A method according to claim 1, wherein if a cancellation message is received from another node during any of said second or third delay periods, the message identifier selection step is started again and the message identifier previously selected is designated as being in use.

4. A method according to claim 1, wherein a node starts normal operation after it has sent an "I am using" message into the network and the other nodes have accepted it, and during normal operation the node monitors the transmissions in the network as far as its own message identifier is concerned, and, if it finds that another node is trying to take the same message identifier, a cancellation message containing the message state of its own message identifier is sent.

5. A method according to claim 1 further comprising the steps of:

establishing a plurality of nodes in an elevator system, said plurality of nodes selected from one or more elevator call buttons on floors of a building, floor call buttons in an elevator car, floor and direction indicators, and door motor control units, each of said nodes lacking any message identifier setting switches.

\* \* \* \* \*